United States Patent
Benson

(10) Patent No.: US 7,418,413 B1
(45) Date of Patent: Aug. 26, 2008

(54) SYSTEM AND METHOD FOR SYNCHRONIZING RESTAURANT MENU DISPLAY WITH PROGRESS THROUGH A MEAL

(75) Inventor: Christopher M. Benson, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 1341 days.

(21) Appl. No.: 10/109,205

(22) Filed: Mar. 28, 2002

(51) Int. Cl.
*G06F 17/30* (2006.01)
*G06Q 30/00* (2006.01)

(52) U.S. Cl. .......................................... 705/27; 705/15

(58) Field of Classification Search ................... 705/15, 705/16, 26, 27
See application file for complete search history.

(56) References Cited

U.S. PATENT DOCUMENTS

| | | |
|---|---|---|
| 5,699,039 A | 12/1997 | Korzen |
| 5,839,115 A | 11/1998 | Coleman |
| 5,845,263 A | 12/1998 | Camaisa et al. |
| 6,208,976 B1 | 3/2001 | Kinebuchi et al. |
| 6,301,564 B1 | 10/2001 | Halverson |
| 6,341,268 B2 | 1/2002 | Walker et al. |
| 6,636,835 B2 * | 10/2003 | Ragsdale-Elliott et al. .... 705/15 |
| 2002/0038165 A1 * | 3/2002 | McHale et al. ............... 700/216 |
| 2003/0182209 A1 * | 9/2003 | Ge et al. ....................... 705/27 |
| 2004/0068441 A1 * | 4/2004 | Werbitt ........................ 705/16 |

* cited by examiner

*Primary Examiner*—Ronald Laneau
(74) *Attorney, Agent, or Firm*—Maginot, Moore & Beck LLP

(57) ABSTRACT

A system and method monitor the progress of a meal and provide course menus in synchronization with the monitored progress of the meal. The system includes a menu application for retrieving course menus and sending them to a patron communicator located at a table in a restaurant. The patron communicator displays the course menu for viewing by the patrons seated at a table. When an attendant receives orders from the patrons, an attendant service indicator is activated to provide an attendant service signal to the patron communicator. The attendant service signal is provided to the menu application so the meal status may be updated and the next course menu corresponding to the updated meal status retrieved. The menu application may insert advertising in the course menus. The advertisements may also include special offers and discounts generated from food supply data so that dishes prepared with food approaching freshness expiration dates may be timely offered. In an alternative embodiment, the patron communicators may receive selection data for identifying menu items for an order so attendants may limit their presence at a table to the delivery of the ordered food.

18 Claims, 2 Drawing Sheets

SYSTEM AND METHOD FOR SYNCHRONIZING RESTAURANT MENU DISPLAY WITH PROGRESS THROUGH A MEAL

FIELD OF THE INVENTION

This invention relates generally to methods and systems for managing restaurant dining service and, more particularly, to methods and systems for managing restaurant dining service through meal orders.

BACKGROUND OF THE INVENTION

Dining experiences may be coarsely divided into two classes. In the first class, a patron orders all the components of a meal for one or more persons at a single opportunity. The patron then pays for the accumulated total, the staff prepares and provides the ordered components at a delivery point for pick-up by the patron or delivery to the patron, and the patron then leaves with the meal or consumes it on the premises. This type of dining experience is typically called fast food dining. As the moniker denotes, this type of dining is directed to prompt specification of meal components, immediate payment, relatively quick production and, usually, non-leisurely consumption of the food. The menus for such an experience is typically comprised of an illuminated and illustrated display of the various meal components and/or meal combinations available for the eating establishment with their prices. To enhance the speed of food ordering and production, the menu items change infrequently and menus for different meals of the day, such as the breakfast menu and lunch menu, are displayed simultaneously with a notice of the times at which the different meal types are available. The standard menu items and limited selections help ensure the dining experience comports well with its identification as "fast food."

A second type of dining experience is more leisurely and typically requires more staff for the dining experience. This type of dining experience begins with one or more dining guests being greeted by a restaurant facilities manager. The facilities manager inquires about the size of the dining party and any special considerations required for their seating, such as environmental matters (smoking or non-smoking) and the need for a special arrangement or views available from the various seating locations. After confirming an appropriate seating location is available for the party, the facilities manager seats the dining party, distributes menus, and notifies the serving personnel of the need to provide water and other complementary meal items, such as bread, to the table.

Shortly after the service of the complementary meal accompaniments, the server attends to the table to answer questions that diners may have and to receive the dining party's orders for drinks. The meal then continues with the server bringing an ordered course, distributing the items, and receiving the party's orders for the next course. If the party has time constraints that require a more expeditiously served meal, they may order more than one course at a time. However, the tempo of the dining experience is typically measured by several food service, next course ordering intervals until all of the courses for the meal have been ordered, served, and consumed. After confirming satisfactory completion of the meal, the server then presents the bill for the meal and returns to retrieve the payment before presenting the receipt for the termination of the establishment's service for the meal.

This second type of dining experience is more labor intensive as the pace of the meal is more or less dictated by the decisions of the dining party to place their orders of subsequent courses and the time the party members take to consume each course. Sometimes, the dining experience is interrupted by the server making appearances to receive orders for a subsequent course before the party is ready to order. The party may be involved in intense conversation or debating the relative merits of menu items. In upscale restaurants, the patrons may be deliberating the selection of a wine that properly complements the various foods being ordered by the party members. The appearance of the server during these periods of intense conversation or deliberations may not be well received by the patrons. On the other hand, a server may perceive a dining party's desire to be undisturbed and become unavailable when the party has a question that requires information from the server. Seeking to obtain the server's attention may then become problematic and frustrate the overall dining experience for the patrons. Thus, there is a delicate balance in a sever being available for orders or answering questions to enhance the dining experience and the restaurant's interest in processing a dining party as efficiently as possible so the table may be made available for another seating.

Many food items in restaurants providing meals that are more leisurely consumed meals than fast food meals, do not retain freshness for extended periods of time or spoil easily. Consequently, the restaurant management prefers to serve these items before they pass the point of optimal flavor or appearance and have to be discarded. To encourage consumption of these items, establishments offer specials on dishes prepared with these items to diners. However, restaurants that use printed menus either have to print an addendum for each menu or, to avoid the cost of printing an addendum, they have the servers orally announce these specials to patrons at the presentation of the menus. Frequently, patrons forget these oral announcements and only consider the standard items from the printed menu for their dining choices.

To address issues related to restaurant management, previously known systems have used been proposed that allow patrons to order menu items for various courses to facilitate their service to the patrons. For example, U.S. Pat. No. 5,845,263 is directed to a system that permits patrons to order all of the items for various meal courses and it then calculates preparation times for the items so the meal progresses in accordance with the calculated timing patterns. While such a system reduces the need for a server to take all of the various orders for the meal courses and efficiently times the preparation and delivery of the food to the table, it hardly accounts for the dining patron's desires. Some people who eat at such establishments are seeking an unhurried meal or, at the least, enjoying a meal at a pace that does not require them to consume food at a rate that conforms to the kitchen's rate of production. Systems that require a patron to order an entire meal at a single time address the restaurant's goal of processing as many patrons as possible but they may leave the patrons feeling that their dining experience was akin to a production line pace. Repeat business, an important component of restaurant stability and profitability, is not as likely in establishments using such systems.

In an attempt to provide more timely notice of specials related to oversupply of food items in a kitchen, U.S. Pat. No. 6,341,268 discloses a system and method for printing menus for patrons upon their time of arrival. Alternatively, the menu may be displayed on a monitor to facilitate timely notification of specials. However, the system of this patent still requires a server to take an order and the order for the entire meal is taken once during the dining experience.

What is needed is a system and method for taking orders from patrons seeking a leisurely dining experience that allows the patrons to place orders without having to have a server present at the table.

What is needed is a system and method for taking orders from patrons in a restaurant that facilitates timely interaction between patrons and servers for information requests or ancillary condiment or complementary food item service.

What is needed is a system and method for taking orders from patrons that enables patrons to participate in the scheduling of the preparation and delivery of their orders.

What is needed is a system and method for displaying food specials in a manner that more closely coincides with their interest in a particular course of a meal.

SUMMARY OF THE INVENTION

The above-noted limitations of previously known systems and methods for taking orders in a restaurant in which patrons are seated for a leisurely dining experience have been overcome by a system and method that operate in accordance with the principles of the present invention. The system of the present invention includes a patron communicator for displaying course menus; an attendant service indicator; and a server having a menu application for generating course menus for display by the patron communicator in response to an attendant service signal received from the attendant service indicator. The server is coupled to a communication network that supports communication between the server and the patron communicators. The patron communicators are preferably in proximity to the tables at which dining patrons are seated for service in the restaurant. The patron communicators display data objects or data forms transmitted from the server that contain course menus. The patrons may make decisions regarding their choices for a meal course. Preferably, each communicator has a unique address so the applications resident on the server may differentiate between the patron communicators coupled to the server through the communication network. In this manner, different course menus may be displayed at different patron communicators in synchronization with the meal being consumed by the patrons.

The attendant service indicator may be a data object displayed on the patron communicator, a data object displayed at a service terminal, or a wireless transmitter that may communicator with a receiver coupled to a patron communicator or a service terminal. When activated, the attendant service indicator provides a signal that a meal course has been ordered. This signal is provided to the server so that the menu application coupled to the server may generate a menu for the next course and transmit it to the patron communicator. Display of the course menu at the patron communicator enables the patrons to view the menu selections for the next course in their meal, either while they wait for the attendant's first visit or subsequent trips to take orders. When the attendant takes the order for one course, the attendant service indicator is activated through a data object displayed at the patron communicator or service terminal or by sending a signal through the wireless transmitter. Upon receipt of the signal from the activated attendant service indicator, the menu application generates the menu for the next course so it may be transmitted to the appropriate patron communicator. In this manner, the patrons have ready access to the menu corresponding to the next course to be ordered while they are enjoying the course just served.

To support the timely notice of specials for course selections, a kitchen terminal may be coupled to communication network. The kitchen terminal may be used to generate special offers to be included in the selections for course menus or used to delete items from the menu that are no longer available from the kitchen. Subsequent menu application responses to attendant service signals then contain the specials for the corresponding meal courses. In addition to the menu courses, the menu application may also provide advertisements to the patron communicators. These advertisements also correspond to the time or stage of the meal. For example, advertisements regarding movies or other theatre events may be displayed during earlier stages of a meal so the patrons may make reservations through the attendant or their own cell phone. Additionally, these advertisements may include discounts to give the patrons an incentive for responding favorably to the advertising. For example, advertising regarding a nightclub may include a discount of no cover charge when a receipt from the restaurant is presented at the nightclub's door. The restaurant may be able to generate revenue from such advertising as other establishments such as theatres and clubs may be willing to pay for targeted advertising in the restaurant.

To further facilitate synchronization between the various courses of the meal and the pace at which the patrons wish to be served, the menu application includes service requests in the course menus. The patrons may then activate a service request to the server so a service application may send a message to the service terminal requesting an attendant be sent to the table from which the service request was received. In another embodiment of the present invention, the service request may include a request for the next course menu so the patrons may consider selections for courses subsequent to the immediately next course. This structure permits the patrons to skip a course or to determine their selections for more than one course. In yet another embodiment of the present invention, the service request may include a form in which a patron may identify menu item selections for one or more courses. This information may then be used to send orders to the kitchen terminal to schedule food preparation and to send the information to the service terminal so the attendant for a table may be apprised of the change in meal scheduling by the table. In this manner, patrons may order courses at their leisure and the attendant need only serve the ordered food when it is ready.

The method of the present invention includes displaying a course menu for a patron, receiving an attendant service signal corresponding to the patron, and displaying a next course menu for the patron in response to the attendant service signal. The course menu contains food items limited to one course of a multi-course meal. Once an attendant serves a course or takes an order, an attendant service signal is generated so the course menu for the next meal course may be displayed for the patron. In this manner, patrons at a table are presented with course menus throughout the dining experience so the patrons need not make selections for an entire meal at a single opportunity for ordering.

The method may also include inserting special offers for menu items in a corresponding course menu for display to a patron. These special offers may be generated in accordance with special offer data received from a kitchen terminal. This method permits the kitchen to occasionally offer specials on food items that may be approaching the expiration of their freshness or to remove items from the menu that are no longer available in the kitchen. The method may also include displaying advertising to the patron. Preferably, this advertising corresponds to the stage of dining for the patron and the timing of the advertised service or product. In this way, theatre tickets are advertised sufficiently prior to curtain time so the patron has an opportunity to finish a meal and make the start of the event. By coupling the server in the restaurant with a data source at the theatre, information regarding specials on remaining tickets may be included in the displayed advertising.

The method may also include generating a service request for a patron so an attendant may be called to a patron's table. The service request permits the attendant to remain unobtrusive to the patrons at the table until the patrons require the service of the attendant. The method may also generate a next course menu request so the patrons may view the menu for the immediately next course and determine their selections for more than one course before requesting the attendant to take their order. Also, the method may include generating a course selection message that contains the menu selections for one or more courses so the patrons may exert more direct control on the timing of the meal. Additionally, the course selection message alleviates the need for the attendant to be present at the table to take orders from the patrons.

The method and system of the present invention allows patrons to pace the delivery of the courses of a meal more effectively and to decrease the need for the presence of an attendant. The system and method of the present invention also provides the restaurant with an opportunity for advertising revenue and to increase the ordering of certain food items with special offers.

It is an object of the present invention to synchronize the presentation of course menus to patrons with the progress of their meal.

It is an object of the present invention to alleviate the need for attendants to interrupt conversation or deliberations ongoing at a table.

It is an object of the present invention to provide advertising to the patrons that corresponds to their progress in the meal.

It is an object of the present invention to facilitate the insertion of specials in the course menus displayed to patrons.

It is an object of the present invention to enable patrons to selectively order courses for a meal without the need of an attendant.

These and other advantages and features of the present invention may be discerned from reviewing the accompanying drawings and the detailed description of the invention.

BRIEF DESCRIPTION OF THE DRAWINGS

The present invention may take form in various system and method components and arrangement of system and method components. The drawings are only for purposes of illustrating an exemplary embodiment and are not to be construed as limiting the invention.

DETAILED DESCRIPTION OF THE INVENTION

Figure 1:
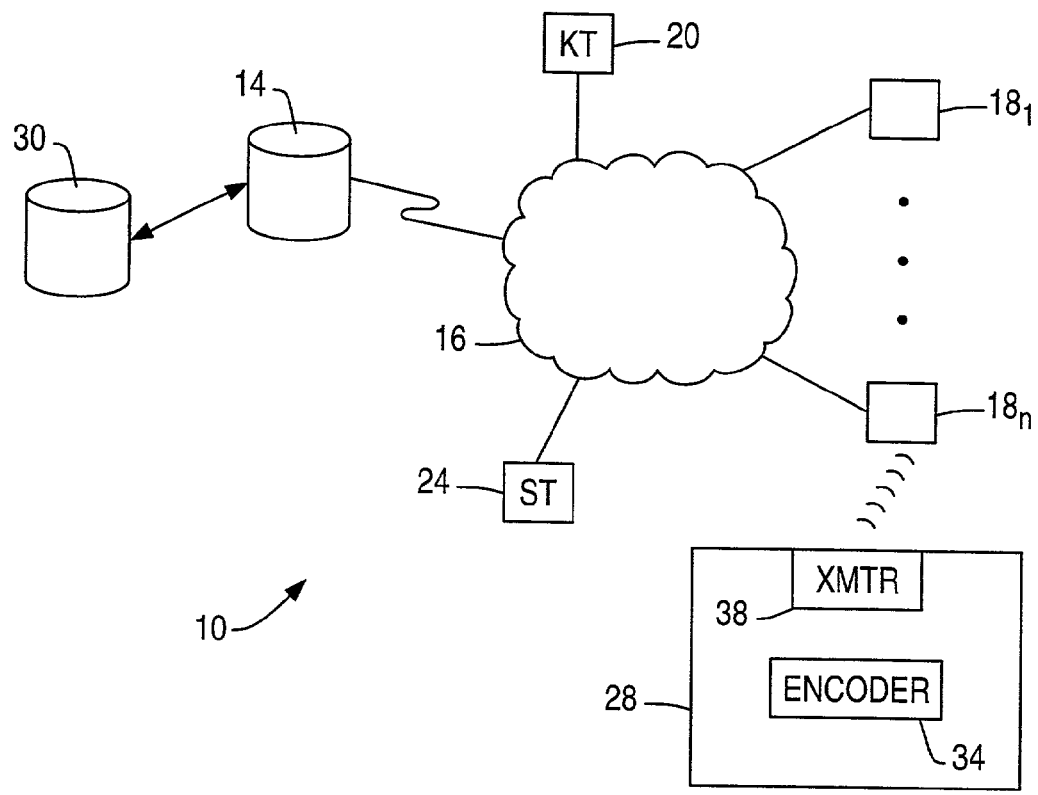
FIG. 1 depicts a block diagram of a system that may be used to display course menus to patrons in synchronization with the progress of their meal.

A system embodying the present invention is shown in FIG. 1. System 10 may include a plurality of patron communicators 18a-18n that may be located at the various places where patrons consume meals, such as tables or booths. From server 14, the communicators receive data objects or forms containing meal course menus that may be displayed by the patron communicators for viewing by the patrons. An attendant service indicator 28 provides a service signal that may be received by a patron communicator or that may be entered in a service terminal 24. The service signal is communicated to server 14 to enable the synchronization between the display of course menus and the progress of a meal ongoing a location proximate one of the communicators. Data that may be used by server 14 for generating special offers to be inserted in the course menus or deleting items from a menu may be entered through kitchen terminal 20.

Figure 2:
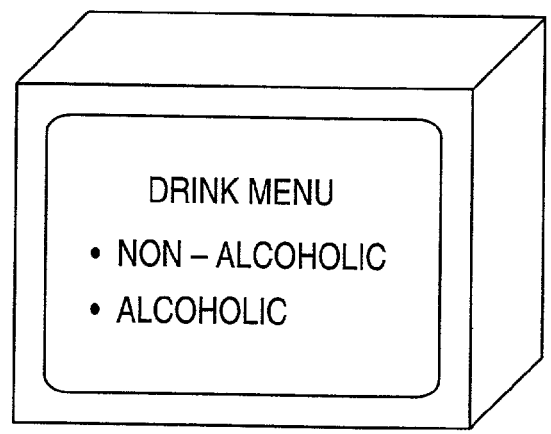
FIG. 2 is a view of a patron communicator that may be used by a patron to view course menus in the system of FIG. 1.

The communication may occur through a computer communication network 16 implementing a known communication standard and protocol, such as an Ethernet network that supports the TCP/IP protocol. Alternatively, network 16 may be a wireless communication network. Patron communicators 18a-18n are display devices that include a processor, memory, and, preferably, a flat screen. The communicators may be coupled to network 16 through known interfaces for computer communication networks. Resident in the communicators are the software applications that manage the network communication function and provide the data objects and forms to a display application program in a communicator. The display application program performs functions similar to those performed by a browser application. The display application program may also manage the execution of script programs and the like to enhance the presentation of the course menus on the communicators. An exemplary display of a drink course menu is shown in FIG. 2.

System 10 preferably includes a plurality of attendant service indicators that may be carried by the attendants who take orders and otherwise wait on the tables in the restaurant. Alternatively, an attendant service indicator may be provided in each communicator by, for example, a mechanical or electronic actuator that an attendant may engage to indicate an attendant service action has occurred. Attendant service actions may include the taking of an order or the delivery of prepared food items. Yet another alternative for indicating the occurrence of an attendant service action is the inclusion of a data object or form in a service terminal. One or more service terminals 18 may be provided in system 10 for communicating information about orders and other facility management data. Service terminals 18 may be provided at attendant service stations located throughout a restaurant and one or more attendants may share a service terminal. To communicate attendant service actions, each attendant enters attendant service data that identifies the table at which the action occurs and the service terminal then sends a service signal to server 14. The table identifier corresponds to the patron communicator identifiers so server 14 is able to determine the patron communicator that should receive a new course menu as a result of the attendant service action that occurred at a table corresponding with the communicator.

Attendant service indicators 28 may be known wireless transmitters having an encoder 34 that encodes a signal with an identifier for transmission by a transmitter 38. In this embodiment, each communicator includes a receiver for receiving the encoded signal from an attendant service indicator. In the embodiments in which the attendant service indicators are actuators, the patron communicators receive a signal indicating an attendant service action when an attendant depresses a mechanical actuator included in a communicator or activates an electronic actuator, such as a defined touch area on the screen of a communicator or a "submit" button of a data form or object. In response to receiving a service signal from an attendant service indicator, whether a wireless transmitter or an actuator, a patron communicator may send a service signal to server 14 to indicate a service action has occurred at the location corresponding to the communicator. In response to receipt of a service signal, a menu application program at server 14 updates the status of the meal progress at the location corresponding to the patron communicator from which the service signal was received. The menu application program then retrieves the menu that corresponds to the next course for the meal in progress at the communicator and sends it to the communicator for display.

In another embodiment of the present invention, the menu application program may be resident at the patron communicator. Prior to seating time for an establishment, server 14 may download menus to the patron communicators for storage. In response to a service signal, the patron communicator retrieves the corresponding menu stored at the communicator and displays it for the patrons. As described more fully below, changes to the menu such as special offers or deletions may then be downloaded to the patron communicators and used by the menu applications at the communicators to modify the menus stored at the communicators. In this embodiment, the patron communicators send messages to server 14 so resource management software at the server may track the progress of the meal for resource management.

Server 14 may be any known computer system having adequate processor speed and memory capability to manage communications with a plurality of patron communicators, service terminals, and a kitchen terminal along with the computer resource management necessary for application program support. Patron communicators 18a-18n may be any computing device with a display that has more limited processing and memory resources such as a personal device assistant or the like. Service terminal 24 and kitchen terminal 20 may be a personal computer or the like having resident application programs for restaurant facility management.

Figure 3:
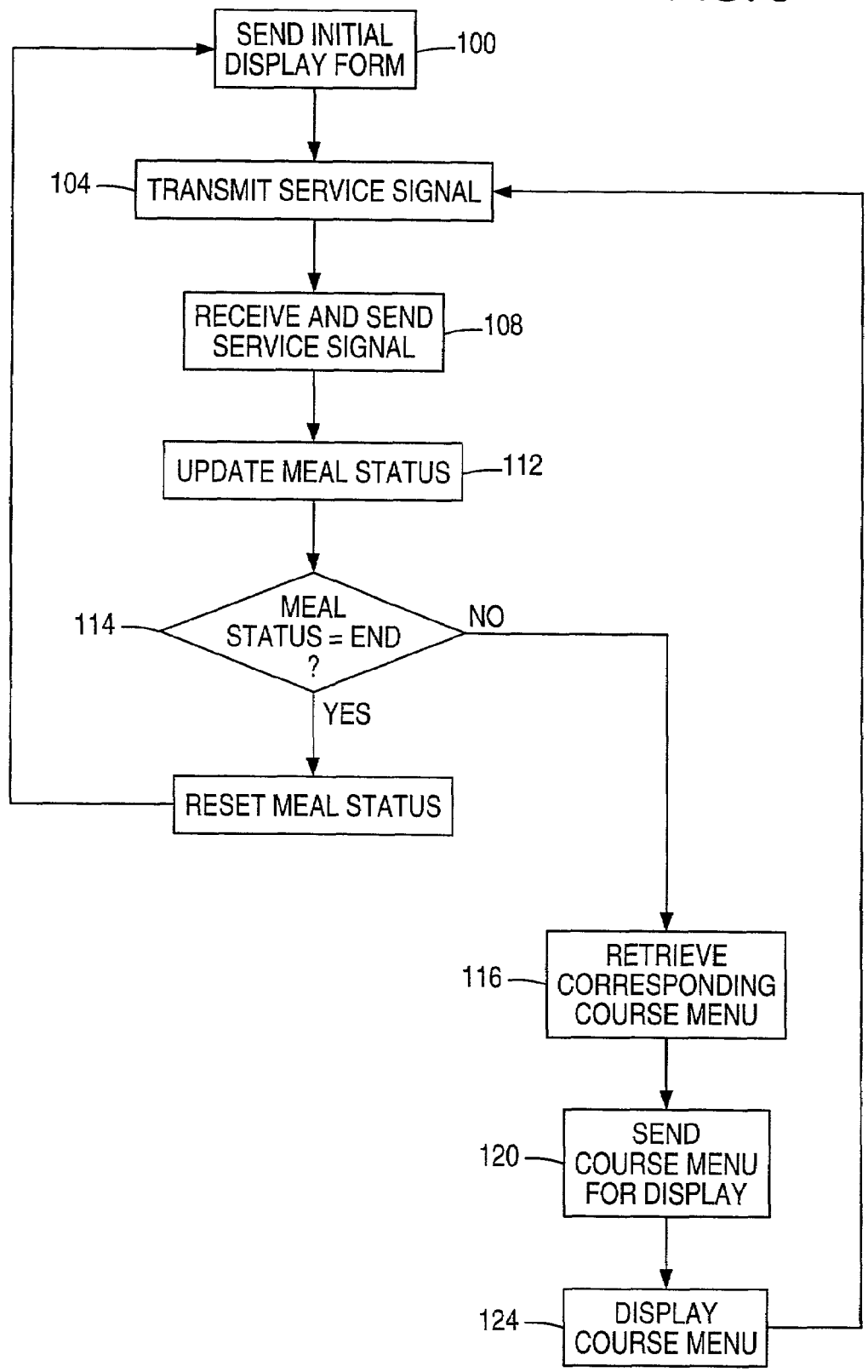
FIG. 3 is a flowchart of an exemplary method for displaying course menus and advertising and for enabling patrons to place orders from a displayed course menu in the system of FIG. 1.

In a system 10 having a server 14 with a menu application, one or more patron communicators, and one or more attendant service indicators 28, the progress of a meal may be monitored and course menus displayed in synchronization with the meal. An exemplary method for such monitoring and synchronization in a system in which the attendants use wireless transmitters for attendant service indicators is shown in FIG. 3. The menu application sends an initial display form to a patron communicator for display at a table before the arrival of patrons (block 100). When patrons are seated, the facilities manager or other person who seated the patrons may activate an attendant service indicator 28 to transmit a service signal to the patron communicator located at the table where the patrons were seated (block 104). The service signal is received by the patron communicator at that location and sent to server 14 (block 108). Server 14 provides the service signal to the menu application coupled to server 14 and the application updates the meal status for the corresponding patron communicator (block 112). If the meal status does not indicate the meal is finished (block 114), the menu application then retrieves the menu corresponding to the updated meal course status (block 116) and sends it to the patron communicator that sent the service signal (block 120). Once the communicator receives the course menu, it displays the course menu for the patrons (block 124) so they may view the menu and determine their selections while they await the appearance of the attendant. Alternatively, a menu application executing in the patron communicator may use the service signal to retrieve and display the next course menu that has been earlier stored in the communicator. The stored menus were previously received from the server and may be later updated as described below. In this embodiment, the service signal may still be provided to the server by the patron communicator so meal progress at the communicator may be tracked for other purposes. In this example, the first course is a drinks course and the menu application would update the meal status to "drinks" and the patron communicator would display the next course menu similar to the one shown in FIG. 2. When the attendant appears and takes the drink order for the table, the attendant activates the service indicator 28 (block 104) so the service signal may be sent to the server 14 (block 108) and the menu application updates the status of the meal (block 112). The menu application would then retrieve the menu for the appetizer course (block 116) and provide it to the patron communicator (block 120) for display (block 124). This method continues until the final meal course is completed and the accumulated bill is paid. Then the finished status of the meal causes the method to reset the meal status (block 128) and send the initial forms to the communicator for display.

By using the method of FIG. 3 or the like, the progress of a meal may be monitored by the menu application program and used to send course menus to the corresponding patron communicator in synchronization with the meal being consumed at the table. Thus, the patrons need not make all of their meal course selections at one time and thereby they are able to better control the pace of their meal.

In another embodiment of the present invention, an advertising database 30 may be coupled to the menu application and server 14. The menu application program may communicate with the database management program for advertising database 30 to retrieve advertising that may be of interest to the patrons. This advertising may be inserted into the course menus so that they are displayed as banner ads or the like in the course menu. Video or audio clips may even be stored and displayed for customers wanting to consider tickets to an event. The menu application program may select advertisements for inclusion in the course menus according to time and the meal course being served. For example, patrons who have just been seated might not be shown an advertisement regarding a play in which the opening act commences within the next fifteen minutes. Also, the advertisements may offer discounts to patrons who use receipts from the restaurant. For example, the menu application may display, during a meal's last course, an advertisement to a party that cover charges at a nightclub are waived when the receipt for the meal is presented at the door of the club. The menu application may only present the advertisement to parties that have spent an amount that exceeds some threshold. Thus, the advertising for the club would be targeted to groups that have the potential to spend significant funds at the club. Such targeted advertising may enable the restaurant to charge clubs, theatres and other establishments for the promotion of those establishments. The processing to determine which advertising to insert in which course menus and the retrieval of the appropriate advertising may be performed in the method of FIG. 3 as part of the selection of the course menu for display at the table. In another embodiment of the present invention, server 14 may be coupled to a data source at a theatre or other establishment that advertises through advertising database server 30. The establishment may communicate special offers, such as reduced ticket prices, to server 14 so the ads stored on server 30 may be updated and displayed at the patron communicators. In this manner, timely special offers may be displayed. Such advertising may enhance business for the eating establishment as customers may be attracted to the restaurant for a meal in order to take advantage of special offers from theatres or other entertainment establishments.

The advertising feature of system 10 may be further enhanced to benefit the restaurant with the entry of kitchen supply data through kitchen terminal 20. Such data may include food supply data such as the dates past which certain foods are no longer fresh or notification of the unavailability of a food item in the kitchen. The food supply data may be used by the menu application or a special offer application, either in kitchen terminal 20, server 14, or other associated terminal, to generate a special offer or discount on dishes prepared with food approaching a freshness expiration date. Also, menu updates deleting dishes that are prepared with items no longer available may be generated from the food supply data. The generated special offers may be included by the menu application in the appropriate course menus in an effort to effectively use the kitchen resources without having to absorb unnecessary losses. The special offer application coupled to server 14 may provide the special offers to the menu application or it may insert the special offers in the advertising database for retrieval. Alternatively, the menu application may generate and insert the offers in a course menu during its selection of the course menu or, if menus are downloaded to the communicators prior to a meal seating session, the updates may be used to modify the menus stored at the communicators.

In another embodiment of the present invention, patron communicators 18a-18n may be used to receive selection data from patrons to identify items in a data form or object for a course menu. The selection of menu items may be done through touch screen activation of items displayed in a menu or through movement of a cursor through a mouse control device, such as a touch pad, joystick, or the like, included in the patron communicators. In this embodiment, the patrons select menu items in a course menu and then return the data form by activating a "submit form" button on the display. In response, the menu application sends data regarding the selected items to the kitchen terminal so the kitchen staff may be notified of the order by hard copy or display. The menu application also sends the data to the service terminal to update the accumulated total for the patrons. When the food is prepared and delivered to the table by the attendant, attendant service indicator 28 is activated to indicate the serving of the food and the service signal may be used to determine the next course menu to send. In this manner, the attendant is not required for placing a course order and the solitude of the patrons is relatively undisturbed until ordered items are served. Additionally, patrons may activate a form for reviewing the bill during the progress of a meal. This information may be useful to patrons for determining whether they want to splurge on some particular item displayed in a menu. Also, a customer satisfaction survey may be presented to the patrons at the conclusion of a meal. Currently, patrons are more inclined to rate restaurant service if some aspect of the meal displeases them. By presenting the survey to customers and making responding relatively easy, more service reports from pleased clientele are likely. Such a survey may include requests for suggestions, including dishes, that customers would like to see on the menu. In this way, a restaurant could receive marketing data useful for planning future menus.

While the present invention has been illustrated by the description of exemplary processes, and while the various processes have been described in considerable detail, it is not the intention of the applicant to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A system for synchronizing the display of a course menu with the progress of a meal comprising:
   a patron communicator for displaying course menus;
   an attendant service indicator;
   a server for delivering course menus to the patron communicator for display at the patron communicator, the display of the course menus being in response to an attendant service signal received from the attendant service indicator; and
   a kitchen terminal for receiving food supply data;
   wherein the server generates menu updates from the food supply data for delivery to the patron communicator.

2. The system of 1 wherein the attendant service indicator is a wireless transmitter for generating a service signal when activated.

3. The system of 1 wherein the attendant service indicator includes an encoder for encoding an identifier in the generated service signal.

4. The system of 1 wherein the patron communicator includes an electronic actuator for the attendant service indicator.

5. The system of 1 wherein the patron communicator includes a mechanical actuator for the attendant service indicator.

6. The system of 1 further comprising:
   an advertising database;
   wherein the server delivers to the patron communicator advertisements retrieved from the advertising database.

7. The system of 1 further including:
   a service terminal for receiving attendant service data to send an attendant service signal to the menu application.

8. The system of 1 wherein the patron communicator receives selection data for identifying items in a data form for a course menu.

9. A system for synchronizing the display of a course menu with the progress of a meal comprising:
   a patron communicator for displaying course menus;
   an attendant service indicator;
   a server for delivering course menus to the patron communicator for display at the patron communicator, the display of the course menus being in response to an attendant service signal received from the attendant service indicator;
   an advertising database;
   wherein the server delivers to the patron communicator advertisements retrieved from the advertising database; and
   a kitchen terminal for receiving food supply data;
   wherein the server generates menu updates from the food supply data for insertion in the advertising database.

10. A method for synchronizing the display of a course menu with the progress of a meal comprising:
    sending an attendant service signal;
    displaying a course menu for a next meal course in response to the attendant service signal being received by a patron communicator;
    receiving food supply data; and
    generating menu updates from the food supply data for inclusion in a course menu.

11. The method of 10 wherein the attendant service signal sending includes wirelessly transmitting a service signal.

12. The method of 10 wherein the attendant service signal sending includes encoding an identifier in the generated service signal.

13. The method of 10 wherein the attendant service signal sending includes activating an electronic actuator in a patron communicator.

14. The method of 10 wherein the attendant service signal sending includes activating a mechanical actuator in a patron communicator.

15. The method of 10 further comprising:
retrieving advertisements for inclusion in a course menu.

16. The method of 10 further including:
receiving attendant service data to send an attendant service signal for updating a meal status.

17. The method of 10 further including:
receiving selection data for identifying items in a data form for a course menu.

18. A method for synchronizing the display of a course menu with the progress of a meal comprising:
sending an attendant service signal;
displaying a course menu for a next meal course in response to the attendant service signal being received by a patron communicator;
retrieving advertisements for inclusion in a course menu;
receiving food supply data; and
generating menu updates from the food supply data for insertion in an advertising database.

* * * * *